United States Patent Office 3,313,371
Patented Apr. 11, 1967

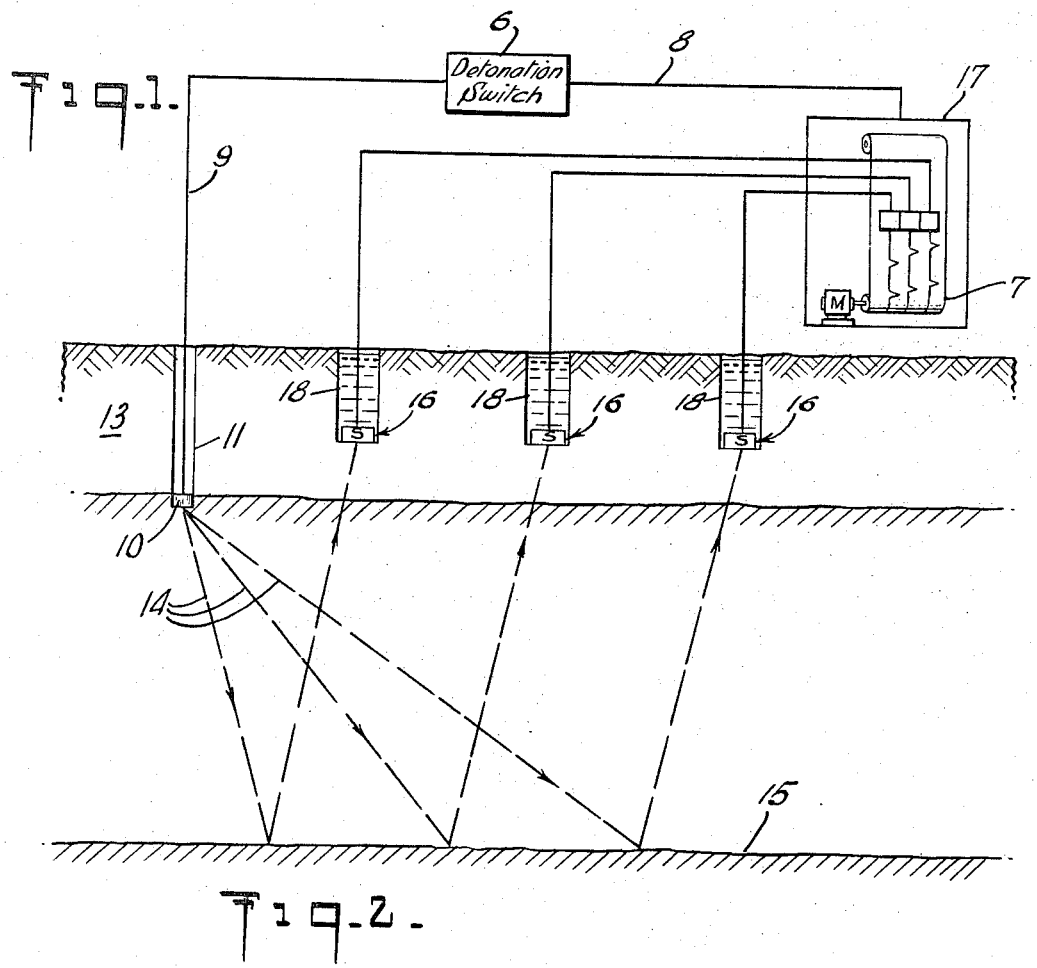
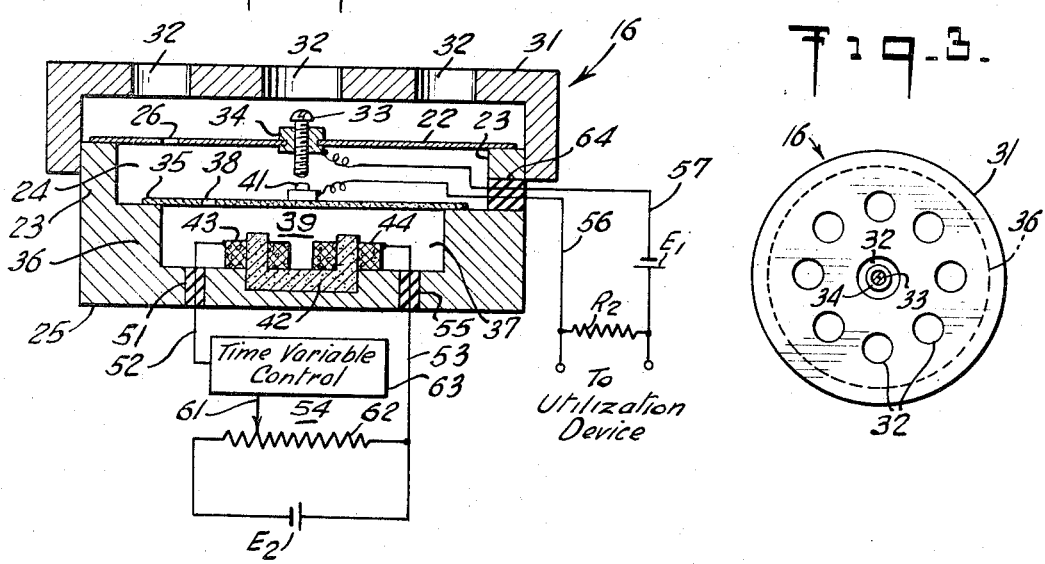

3,313,371
PRESSURE ACTUATED SWITCH USED IN A SEISMIC PROSPECTING SYSTEM
Alvin L. Parrack, Bellaire, Roy J. Clements, Houston, and Oswald A. Itria, Bellaire, Tex., assignors to Texaco Inc., New York, N.Y., a corporation of Delaware
Filed Apr. 7, 1964, Ser. No. 358,028
3 Claims. (Cl. 181—.5)

This invention relates to geophysical exploration and more particularly, to an improved system for geophysical exploration employing seismic waves.

In seismic reflection surveying, the depths of underlying geophysical formations are determined by measuring the time intervals elapsed between the generation and reception of a burst of seismic wave energy which has been generated such as by exploding a charge of explosives, above, on or below the surface of the earth. In seismic reflection surveying as it is usually practiced, a charge of explosives is set off at a point beneath the earth's surface known as a shot point. The shot point is more frequently located beneath the low velocity or weathered layer which is an unconsolidated and aerated formation which exhibits seismic wave velocities of less than 5000 feet per second, frequently less than 2000 feet per second. After the explosion of the charge, certain of the seismic waves travel from the shot point to underlying strata where they are refracted and reflected back toward the earth's surface and then picked up by seismic wave detectors or geophones. Geophones or seismic detectors are devices which are provided with means for converting pressure variations created in the earth by the seismic waves into electrical variations. The geophones used to detect the reflected seismic waves are arrayed in a suitable manner depending on local conditions and the type of seismic information desired. Usual practice is to array the geophones in a straight line passing near, through, or over the shot point and at or near the earth's surface. The geophones are spaced from each other and from the shot points usually at regular intervals.

It is known that the seismic waves are attenuated by the earth through which they travel. Accordingly, the geophones must not only respond to the high amplitude seismic waves from the nearby reflecting boundaries but must also be sufficiently sensitive to respond to the weak amplitude signals received from the deeper reflecting boundaries. Accordingly, the electrical signals generated by these sensitive geophones contain electrical signals resulting from unwanted phenomena such as ground roll and wind effects. This so called clutter and random noise not associated with the desired reflected seismic waves, is usually eliminated by the use of appropriate filter circuits in one or more amplifiers which are connected to the output of the geophones.

Notwithstanding the filtering, the detection and identification of reflected seismic waves is difficult in the presence of noise picked up by the geophones. Additional factors complicating the identification of the detected seismic waves and the interpretation of the seismic records are the influences exhibited by the varying physical characteristics of the underlying geological formations upon the seismic waves.

The pressure-actuated switch of the present invention is an on-off device rather than a device which provides electrical variations in accordance with the variations in amplitude of the seismic waves detected. This switch requires good coupling to the earth for the proper operation. Accordingly, the pressure-actuated switch of this invention is adapted to be coupled to the earth through a liquid or other good pressure wave transferring medium such as drilling fluid. Therefore, the pressure-actuated switch is located in a liquid filled shallow hole, a marshy area or beneath the water for off-shore exploration.

The present invention provides electrical signals upon the detection of reflected seismic waves such that filtering, amplifying, or other techniques for enhancing signal-to-noise ratio are not necessary. This is accomplished by replacing the usual geophone or seismometer with a pressure-actuated switch having a time variable sensitivity. The sensitivity of the switch is controlled so that the switch responds to the pressure of the desired reflected signals without being substantially affected by undesired pressure waves such as are caused by ground roll and other effects. The output from the switch consists of equal amplitude pulses, the time of appearance of which correspond to the times of arrival of reflected seismic waves. These pulses when recorded provide a record which is substantially free of undesired signals. Such pulses, as mentioned previously, do not require the application of enhancement techniques thereto, such as filtering, but are in a form which is easily adaptable to computer use.

Pressure sensitive switches have previously been used in geophysical exploration such as in U.S. Patent 2,922,484, issued Jan. 26, 1960, to W. T. Kelley et al. In this patent, the switch responds to the arrival of a downwardly travelling seismic wave in the earth to detonate an explosive charge which in turn produces a downwardly travelling seismic wave which reinforces the original downwardly travelling wave.

Accordingly, it is an object of this invention to provide an improved system for geophysical exploration employing seismic waves.

It is another object of the present invention to provide a pressure-actuated switch for detecting pressure waves in a geophysical exploration system.

It is a further object of the present invention to provide a pressure-actuated switch in a seismic exploration system which has a variable sensitivity.

It is another object of the invention to provide a geophysical exploration system utilizing seismic waves which does not require filtering, amplifying or other techniques for enhancing signal-to-noise ratio.

It is a further object of the present invention to provide a clean seismic record of equal amplitude pulses which are readily adaptable for computer use.

In order that the invention may be more clearly understood and readily carried into effect, it will now be described more fully with reference to the accompanying drawings in which;

FIG. 1 shows diagrammatically a vertical section of the earth and depicts a seismic exploration system operable therein;

FIG. 2 shows a cross-section of a pressure-actuated switch and the electro-magnetic circuit for changing the sensitivity of the same with respect to time; and FIG. 3 illustrates the perforations in the protective cap of the pressure-actuated switch shown in FIG. 2.

Referring to FIG. 1, there is shown a seismic reflection exploration system in which an explosive charge or shot 10 is located at the bottom of shot hole 11 which usually extends from the earth's surface 12 to a point just below the weathered layer 13. The shot 10 is detonated by a pulse from detonation switch 6 via lead 9, which switch simultaneously applies a pulse to the recorder 7 over a suitable path such as the conductor 8. The pulse is utilized to establish the time base reference for recording the relationship of the shot to the recorded signals. The detonation of the shot 10 gives rise to downwardly travelling seismic waves 14 which are reflected from any underlying boundary or interface 15 between two geophysical layers having different acoustic impedances, i.e., different values for the product of density by acoustic velocity.

The reflected components of the seismic waves 14 are intercepted by the array of pressure actuated switches 16. The pressure actuated switches 16 are shown at the bottom of shallow holes 18 which are filled with a fluid such as drilling mud or water to effect good pressure wave coupling between the earth and the switch. The pressure-actuated switches are capable of converting the reflected seismic wave pulses into electrical energy pulses of a fixed amplitude.

The electrical pulses are directly adaptable for computer use, without having to apply techniques for enhancing the signal-to-noise ratio. However, the usual procedure is to initially record the signals, for example on magnetic tape, and play back the same at a remote computer center. The utilization device 17 is depicted in FIG. 1 as a magnetic recorder 7 having an idealized waveform thereon resulting from seismic exploration using pressure-actuated switches.

A pressure-actuated switch 16 which may be used in the geophysical exploration system is shown in more detail in FIG. 2. This switch includes a resilient flexible member, for example, a rubber diaphragm 22, stretched across the opening created by circular wall member 23 of body member 25 and connected to the upper rim of said wall member 23. A capillary or vent opening 26 is located in the rubber diaphragm 22 for equalizing the static pressures on either side thereof. However, the opening 26 is small enough so that it does not equalize pressures sufficiently upon the arrival of seismic pulses to interfere with the sensitivity of the switch. A protective cap or cover 31 having perforations or openings 32 and which may be made of Bakelite or similar plastic material is held to wall member 23 of body member 25 by means of a tight or friction fit.

An adjustable metal screw 33 is inserted through a threaded metal nut 34 which is attached at the center of the rubber diaphragm 22. The screw 33 serves as one contact of a pair of electric contacts. A second diaphragm 35 is located below the rubber diaphragm 22 and is stretched over a further opening 37 formed in the body member 25 by a smaller diameter portion 36 of wall member 23. This second diaphagm 35 is made of a flexible sheet of ferromagnetic material and is rigidly connected to the upper surface of the smaller diameter portion 36 of the wall member 23. A vent opening 38 is located in the second diaphragm 35 to equalize the pressure on either side thereof. A second metal contact 41 of the pair of contacts is located at the center of the second diaphragm 35 and lies directly below the end of metal screw 33 which forms the first contact. Located at the bottom of the opening covered by the second diaphragm 35 and centrally located with respect thereto is an electromagnet 39 comprising a high permeability magnetic core 42 which is preferably U-shaped and has an electric coil 43, 44 wound on each leg thereof. The pole pieces or leg portions of the electromagnet 39 extend towards the second diaphragm 35.

The electrical arrangement for energizing the electromagnet 39 consists of a source of electric energy, such as a battery E2 connected with the coils 43, 44 by means of wires 52 and 53. The wires 52 and 53 pass through insulated plugs 51 and 55 in body member 25, respectively. A potentiometer 54 is connected across the battery E2 and in parallel with the series connected coils 43 and 44. The wiper 61 of the potentiometer 54 is varied along the potentiometer resistance 62 by a time variable control 63.

The pair of electric contacts consisting of screw 33 and contact 41 are connected in series with battery E1 by means of wires 56 and 57. These leads connect the contacts 33 and 41 to the utilization device 17 (FIG. 1). The leads 56 and 57, likewise, pass through an insulated plug 64 in body member 25.

A plan view of protective cap or cover 31 is illustrated in FIG. 3. The cover 31 has perforations 32 having sufficiently large areas to readily pass the seismic pressure wave through to the rubber diaphragm 22.

In operation, the seismic wave pulses easily pass through the openings 32 in the protective cover 31 and cause a displacement of the rubber diaphragm 22. If the pressure applied to the diaphragm 22 is of sufficient amplitude, the diaphragm will be displaced sufficiently so that screw contact 33 will engage contact 41 and complete the electrical circuit to the utilization device 17 thus producing an electrical pulse of an amplitude determined by the voltage of the battery E1. It will be appreciated, that the seismic wave pulse consists of a succession of alternate compressions and rarefactions. The duration of a compressional component of the wave is short and the rate of occurrence is dependent on the frequency of the wave. The rubber diaphragm 22 has a very rapid recovery time. Accordingly, the switch produces, in response to a seismic wave, pulses of a predetermined amplitude and of a frequency determined by the frequency of the seismic wave detected.

As mentioned previously, the seismic waves are attenuated by the earth formations through which they travel. Therefore, the earlier received seismic waves reflected from a close underlying interface will be of a greater amplitude than seismic waves arriving at a later time from deep underlying interfaces. Accordingly, it is necessary to have a switch of variable sensitivity. The sensitivity of the switch is varied with time by the time variable control 63 which causes the wiper 61 of potentiometer 54 to move along the resistance wire 62 of the potentiometer thus applying a varying proportion of the voltage of battery E2 across the coils 43, 44. When the wiper 61 is at the extreme left hand position of resistance 62, the maximum proportion of the voltage of battery E2 is applied across the coils 43, 44 and maximum current flows in coils 43 and 44. This flow of current through the coils produces a magnetic field which is aided by the magnetic material in U-shape member 42 to attract the magnetic diaphragm and cause a downward movement thereof. The downward displacement of diaphragm 35 causes a greater separation between contacts 33 and 41 thereby rendering the switch relatively insensitive so as to respond only to seismic wave pulses of a high amplitude. The clutter and noise pulses of a lower amplitude will have little or no effect on the switch.

As the wiper 61 is moved to the right with respect to time, the proportion of the voltage of battery E2 applied to the coils 43, 44 diminishes and less current flows. It can be seen that the magnetic field becomes weaker as the current flow decreases and accordingly, the amount of displacement of the magnetic diaphragm is decreased. It can be seen that the smaller the displacement of the magnetic diaphragm from its normal position the smaller the air gap between contacts 33 and 41 and accordingly, the greater the sensitivity of the switch. At the end of the sweep of the wiper 61, toward the right, the switch will have its greatest sensitivity so as to be able to detect the low amplitude seismic waves from the interfaces deep within the earth.

Any standard commercially available time variable control 63 or timer arrangement could be utilized to provide the positioning of the wiper 61 of potentiometer 54 with respect to time. The timer 63, of course, should be adapter to provide the complete time variations of the wiper 61 over a 5 or 6 second time span. This is the usual time encountered from detonation of the shot 10 until the arrival of the last deep reflection signal at the receiver 16.

A very simple form of the time variable control 63 might be an electric motor, the shaft of which has attached thereto the wiper 61 of the potentiometer 54. The potentiometer in such an arrangement, of course, would be of the well known rotary type. The arrangement of a motor driven wiper could for economy reasons be best utilized where the time variable control 63 and potentiometer 54 are common to each switch. That is, the motor and the potentiometer 54 could be located remotely from the switches and electrically connected thereto by their respective leads 52 and 53 as shown in FIG. 2. In such an arrangement, an electrical signal similar to the electrical signal generated on lead 8 by the detonation switch could be utilized to energize the wiper motor to start the timer operation.

On the other hand, the preferable arrangement might be a more economical simple mechanical clock mechanism located at each switch and energized electrically by the first response of the switch. Accordingly, the time mechanisms in such an arrangement would begin their respective timing control at times determined by the receipt of the first reflected signal and extend the control for a predetermined time interval.

It will be appreciated that the time variable control not only provides the movement of the potentiometer wiper 61 as a function of time, but also, when energized, completes the electrical connection between the wiper 61 and lead 52 so as to energize the electromagnet 39. Since the timers per se form no part of this invention and are commercially available, further details thereof would serve no purpose herein and accordingly have not been included.

Obviously, other modifications and variations of the invention as hereinbefore set forth may be made without departing from the spirit and scope thereof, and therefore, only such limitations should be imposed as are indicated in the appended claims.

We claim:

1. In a seismic prospecting system comprising a source of seismic waves and a seismic detecting array comprising a plurality of receiving stations for receiving seismic waves transmitted through the earth from said source and a signal utilization device coupled to the respective receiving stations for receiving signals from each of said receiving stations and for recording the signals received from each of said receiving stations in correlation with one another relative to a common time base, the improvement wherein each of said receiving stations comprise a pressure actuated switch and an automatic variable switch sensitivity adjustment means for increasing the sensitivity of said switch in accordance with a predetermined function of time to provide a fixed amplitude signal applied to said utilization device in response to seismic waves of sufficient amplitude, said pressure actuated switch comprises a housing, a resilient diaphragm attached to said housing and forming a wall thereof, an inner diaphragm made of conducting material located within and attached to said housing forming an inner wall displaced from and parallel to said resilient diaphragm, a pair of contacts, each of said contacts being attached to and carried by a respective one of said diaphragms at corresponding positions so that they are opposite one another, said contacts being separated by a predetermined air gap, an electrical circuit connected to said utilization device and to said contacts for completing a circuit therethrough when said pair of contacts are engaged.

2. In a seismic reflection prospecting system comprising a source of seismic waves and a seismic detecting array comprising a plurality of receiving stations for receiving seismic waves transmitted through the earth from said source and a signal utilization device coupled to the respective receiving stations for receiving signals from each of said receiving stations and for recording signals received from each of said receiving stations in correlation with one another relative to a common time base, the improvement wherein each of said receiving stations comprises a pressure-actuated switch means comprising a housing, a resilient diaphragm forming one wall of said housing for responding to reflected components of said seismic waves, a conductive diaphragm located within said housing displaced from and parallel to said resilient diaphragm, a pair of contacts, each of said diaphragms carrying a contact of said pair of contacts at a position thereon opposite one another, said diaphragms being sufficiently displaced from one another to form a predetermined air gap between said contacts thereby determining the sensitivity of said switch, output electrical circuit means including said signal utilization device connected to each of said contacts for completing a circuit to said utilization device when said contacts are engaged, electromagnetic means attached to said housing and located adjacent said conductive diaphragm for producing an electromagnetic field coupled to said conductive diaphragm, an electrical circuit means connected to said electromagnet for varying the field of said electromagnet, a variable potentiometer connected in said electrical circuit and a timer means for varying said potentiometer in accordance with a predetermined time function to thereby vary said field of said electromagnetic means to adjust the position of said conductive diaphragm and accordingly the air gap of said pair of contacts whereby the sensitivity of said switch is adjusted.

3. In a seismic prospecting system comprising a source of seismic waves and a seismic detecting array comprising a plurality of receiving stations for receiving seismic waves transmitted through the earth from said source and a signal utilization device coupled to the respective receiving stations for receiving signals from each of said receiving stations and for recording the signals received from each of said receiving stations in correlation with one another relative to a common time base, the improvement wherein each of said receiving stations comprise a pressure actuated switch and an automatic variable switch sensitivity adjustment means for increasing the sensitivity of said switch in accordance with a predetermined function of time to provide a fixed amplitude signal applied to said utilization device in response to seismic waves of sufficient amplitude, said pressure actuated switch comprising a housing, a resilient diaphragm attached to said housing and forming a wall thereof, an inner diaphragm made of conducting material located within and attached to said housing displaced from and parallel to said resilient diaphragm, a pair of contacts, each of said contacts being attached to and carried by a respective one of said diaphragms at corresponding positions so that they are opposite one another, said contacts being separated by a predetermined air gap, an electrical circuit connected to said utilization device and to said contacts for completing a circuit therethrough when said pair of contacts are engaged, said automatic variable switch sensitivity adjustment means for changing the sensitivity of said switch in accordance with a predetermined function of time comprises an electromagnet located within and attached to said housing adjacent said inner diaphragm, a further electrical circuit means for energizing said electromagnet to produce an electromagnetic field passing through said inner diaphragm, and an electrical circuit varying means connected in said electrical circuit means for varying the electrical energization of said electromagnet to vary said electromagnetic field and the position of said inner diaphragm thereby adjusting the air gap between said contacts carried by said diaphragms.

References Cited by the Examiner

UNITED STATES PATENTS

| | | | |
|---|---|---|---|
| 337,231 | 3/1886 | Bergmann | 179—139 |
| 1,847,873 | 3/1932 | Hecht et al. | 181—0.5 |
| 2,081,619 | 5/1937 | Ebert. | |
| 2,922,484 | 1/1960 | Kelly et al. | 181—0.5 |
| 3,014,550 | 12/1961 | Gales et al. | 181—0.5 |
| 3,016,970 | 1/1962 | Allyn et al. | 181—0.5 |
| 3,076,177 | 1/1963 | Lawrence et al. | 181—0.5 X |
| 3,137,837 | 6/1964 | Wreford | 181—0.5 X |

BENJAMIN A. BORCHELT, *Primary Examiner.*

M. F. HUBLER, *Assistant Examiner.*